United States Patent [19]

Kaye

[11] 4,044,746

[45] Aug. 30, 1977

[54] FUEL CONTROL DEVICE

[75] Inventor: Ronald Swynerton Kaye, Mt. Eliza, Australia

[73] Assignee: Marie Kaye, Mt. Eliza, Australia; a part interest

[21] Appl. No.: 553,827

[22] Filed: Feb. 27, 1975

[30] Foreign Application Priority Data

Dec. 24, 1974 Australia .............................. 0135/74

[51] Int. Cl.2 .......................... F02M 5/10; G05D 9/00

[52] U.S. Cl. .............................. 123/139 AV; 123/136; 137/115; 137/116.3

[58] Field of Search .............................. 137/115, 116.3; 123/139 AV, 139 AW, 136, DIG. 2

[56] References Cited

U.S. PATENT DOCUMENTS

| | | | |
|---|---|---|---|
| 1,044,444 | 11/1912 | Englesson | 137/115 |
| 1,352,123 | 9/1920 | Green | 123/139 AV |
| 2,103,299 | 12/1937 | Ravnsbeck | 137/115 |
| 2,174,797 | 10/1939 | Magnuson | 137/115 X |
| 3,196,926 | 7/1965 | Gartland | 137/115 X |
| 3,339,574 | 9/1967 | Erb et al. | 137/115 X |
| 3,451,416 | 6/1969 | Nyberg | 137/115 X |
| 3,476,134 | 11/1969 | Kemp | 137/115 |

FOREIGN PATENT DOCUMENTS

| | | | |
|---|---|---|---|
| 446,468 | 3/1974 | Australia | 137/115 |

*Primary Examiner*—Carroll B. Dority, Jr.
*Assistant Examiner*—Tony M. Argenbright
*Attorney, Agent, or Firm*—Brady, O'Boyle & Gates

[57] ABSTRACT

A fuel control device for internal combustion engines which is located between the fuel pump and carburetor. Consisting of two parts, the first is located adjacent the carburetor inlet and includes a pressure responsive valve to control the fuel pressure from the pump and an overflow outlet to the second part. This second part includes a second pressure responsive valve operating at a pressure above that of the valve in the first part. A line from this second part leads to the inlet side of the fuel pump.

6 Claims, 2 Drawing Figures

FUEL CONTROL DEVICE

Figures 1, 2:
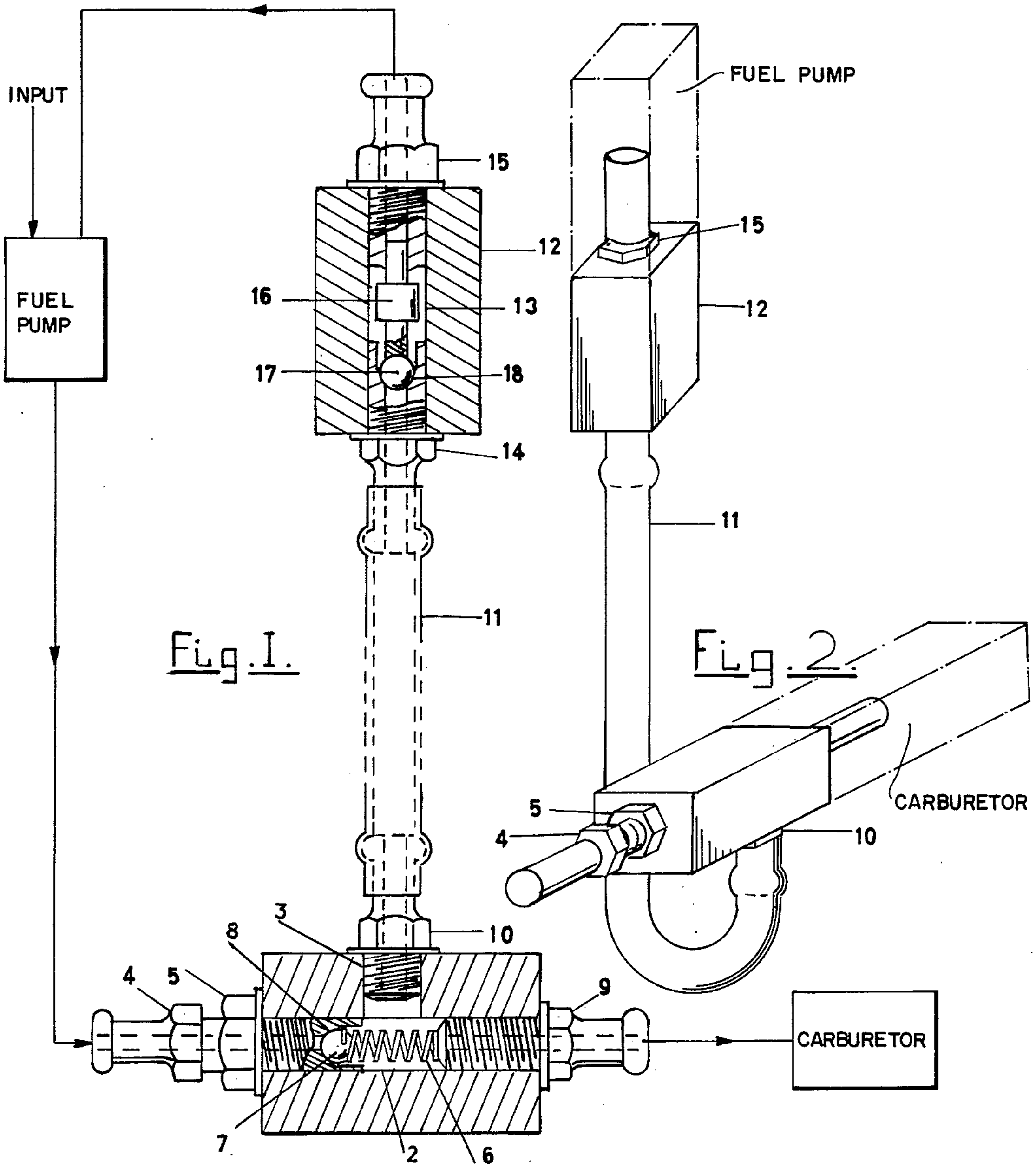

This invention relates to a fuel saving device of the kind adapted to control fuel pressure in the line to the carburettor for internal combustion engines.

A device previously devised comprised a housing including a chamber communicating with which is an inlet, an outlet to the carburettor, an overflow outlet which includes a pressure responsive means that only opens said overflow outlet above a minimum fuel pressure value.

This device has many inherent problems associated with the ease of fitting it to a vehicle and with ensuring that the device will remain operable in achieving fuel consumption reduction and remain safe. This device cannot be satisfactorily attached to the carburettor because of its size and because of the absence of a suitable point for attachment of the carburettor. The most usual arrangement is for the fuel line to be cut between the fuel pump and carburettor and between the fuel pump and fuel tank. Plastic connection hoses are then used to connect the inlet and outlets of the device to the carburettor and fuel pump. The device itself is usually mounted on the air filter or on the wheel housing. Because in one arrangement a fixed weight ball valve is used in the overflow outlet this device of necessity had to be mounted vertically.

The number of flexible plastic fuel lines required by this device increased the possibility of fuel line breakage. Safety considerations could only be satisfied by using heavy duty tubing which increases the cost of installation.

The object of this invention is to provide a device which can be more conveniently installed and which can avoid the cost and safety problems associated with previous devices.

To this end the present invention provides a fuel regulating device for motor vehicles comprising a first unitary housing adapted to be connected into the fuel line between the fuel pump and carburettor and including a pressure responsive means adapted to prevent fuel flow to the carburettor below a minimum pressure value said first unitary housing including an overflow outlet passage connected to a second unitary housing which includes a pressure responsive means adapted to allow fuel flow above a fuel pressure value which is greater than said minimum fuel pressure value of said pressure response means in said first housing.

In operation, the present invention is noticeably effective in that it eliminates the buildup of the characteristic red carburettor stain caused by excess fuel entering the carburettor. In various tests, the device has resulted in 20 to 25% increase in fuel economy for a standard six cylinder car.

By maintaining the fuel pressure within a very narrow range of values, excess fuel build-up caused, for example by sudden release of the accelerator, cannot occur because the sudden change in pressure will activate the overflow outlet and the excess fuel is returned to the fuel tank or pump. However, the pump itself is also controlled because of the minimum operating pressure required for fuel to pass through the device into the carburettor. If there is no demand for fuel, then the pump will not operate.

A further advantage of this device is the elimination of fuel pressure pulsation caused by the fuel pump. The fixed fuel pressure resulting from this device at the carburettor inlet means that the carburettor can operate under much steadier conditions and achieve much higher efficiency.

A common cause of fuel wastage characterized by red carburettor stain is expansion of fuel in the fuel line between the pump and carburettor caused by absorption of heat from the engine after the engine has been turned off. Normally, this expansion opens the carburettor needle valve inlet allowing excess fuel to weep into the carburettor. With the device of this invention, the overflow outlet valve opens returning the fuel to the inlet side of the pump and avoids leakage to the carburettor.

By separating the location of the two pressure responsive means the size of each housing is reduced so that the first housing can be located abutting the carburettor. The outlet end of the first housing can conveniently be connected directly to the carburettor inlet. The fuel line from the fuel pump can be connected to the housing inlet. Because of its reduced size, this first housing requires no support or attachment to the vehicle body. The overflow outlet of the first housing is conveniently connected by a short length of plastic hose to the second housing. The second housing also requires no support or attachment. However, if a weight and ball is used as the pressure responsive means, instead of a spring and ball, then this second housing should be secured in a vertical position to the vehicle body, air filter, or any other convenient location.

The use of two housings allows the first housing to be attached close to the carburettor and this eliminates the need to use any extra heavy duty fuel line tubing. The overflow fuel line, which is not subjected to a high fuel pressure, can still comprise plastic tubing.

Both housings can initially be machined in the same shape and size with provision for insertion of the pressure responsive valve means. Then one batch can be further machined to take the overflow outlet and be used as the first housing. This method of production has a greater cost saving potential than methods of producing the previously designed unitary device.

In locating the second housing, care should be taken to avoid placing it too far below the first housing and preferably it should be located just above the first housing. As mentioned previously, the most convenient location is usually the carburettor inlet for the first housing and the air filter for the second housing. In one construction according to this invention, the second housing includes a weight and ball valve arrangement which can support about a 24 inch column of fuel enabling it to be located some distance below the first housing and the fuel pump.

In installing the device it is preferred that the overflow outlet from the first housing be oriented below the horizontal, preferably from a four o'clock to an eight o'clock position. The flexible line from this outlet to the second housing is then arranged to form a loop below the second housing to prevent passage of air bubbles from the first housing to the second housing. Any bubbles in the fuel line will pass to the carburettor.

A practical arrangement of this invention according to one preferred embodiment will now be described with reference to the drawing in which FIG. 1 is a sectional view of the device and FIG. 2 is a view of the device orientated for installation.

The first housing 1 comprises the passage 2 bored along its longitudinal axis and the passage 3 bored at right angles to communicate with passage 2 intermediate its length. The inlet end of the first housing 1 is formed from the screw threaded nozzle 4, which fits into the complementary screw threaded bore 2; nut 5, which provides an effective seal for the inlet; and the spring 6 and ball 7 which co-operate with valve seat 8 in nozzle 4 to form a pressure responsive inlet valve. By turning nozzle 4 the operative pressure of the inlet valve can be varied.

At the opposite end of bore 2 to the inlet from the fuel pump is the outlet to the carburettor formed by nozzle 9 which is screw-threaded to fit into the complementary thread of bore 2. Nozzle 9 provides a base for spring 6 of the ball and spring inlet valve.

Fitting into threaded bore 3 is the complementary screw-threaded nozzle 10, which is linked by flexible tubing 11 to the bottom of the vertically oriented second housing 12.

Housing 12 also includes a bore passage 13 along its longest axis as did the first housing 1. The first and second housings are machined from the same rectangular or cylindrical block.

After the longitudinal bore is formed, one out of every two blocks is further machined to form housing 1 while the remainder form housing 12.

The second housing 12 includes screw-threaded nozzle 14 fitting the complementary threaded bore 13 and a similar nozzle 15. Nozzle 14 is connected by flexible tubing 11 to nozzle 10 of the first housing 1. Nozzle 15 is adapted for connection by flexible tubing to the inlet side of the fuel pump.

Within bore 13 is located the cylindrical weight 16 and ball 17 which, with valve seat 18 in nozzle 14, form a fixed value weighted valve. When the pressure value in line 11 exceeds the weight of the ball 17 and cylinder 16 fuel is able to pass through passage 13 and nozzle 15 back to the inlet side of the fuel pump.

In operation the weight of cylinder 16 and ball 17 is selected such that it is slightly less than the corresponding pressure required to open the inlet needle valve of the carburettor. Where a ball and spring valve is used instead of a fixed weight in the overflow outlet, the tension of the spring is adjusted to a value just less than that required to open the carburettor needle valve.

The inlet to the first housing is adjusted by turning nozzle 4 to increase tension in spring 6 until the pressure required to open the inlet valve is just less than that required to open the overflow outlet valve in housing 12.

In FIG. 2 the first housing 1 is oriented for installation so that outlet 9 (not shown) can be connected to the carburettor inlet. The outlet 10 of the first housing 1 is directed downwards so that a loop is formed in tubing 11 below housing 12. This prevents bubbles entering the second housing 12.

In testing the pressure value of the device of this invention during installation, the meter can simply be attached to the overflow outlet from the first housing. In the previous device this was not possible and the inconvenient expedient of disconnecting the outlet to the carburettor from the fuel line and measuring the pressure at that outlet was the only available method. The present invention is thus more easily installed than the previous device.

It is possible for the first housing to be incorporated into a carburettor body as a unitary carburettor construction. This is ideal where the device is required in a new car or a replacement carburettor. Similarly, the second housing can be incorporated into the fuel pump on its inlet side if this is desired.

A fuel control device as described in relation to the drawings was installed in a late model Cadillac having an engine capacity of 472 cubic inches. Prior to fitting, this car's fuel consumption was determined on average to be 13.5 miles per gallon of fuel. After fitting of the device, this car was found to have on average a fuel consumption of 18 miles per gallon. An improvement in the ease of starting the engine was also noticed, as well as an improvement in the car's acceleration.

I claim:

1. A fuel regulating device for motor vehicles having a fuel pump, a carburetor and a connecting fuel line, comprising a block having a bore formed therein to provide a first unitary housing, one end of said bore being adapted to be connected to the fuel pump outlet line, the opposite end of said bore being adapted to be connected to the fuel inlet line to the carburetor, pressure responsive means mounted in said bore to prevent fuel flow to the carburetor below a minimum pressure, a second bore formed in said block extending transversely to said first bore and communicating therewith; a second block of the same configuration as said first block and having a bore formed therein providing a second unitary housing, conduit means connecting said second bore to one end of the bore in said second block, the opposite end of the bore in said second block being adapted to be connected to the inlet of said fuel pump, and pressure responsive means in the bore of said second block adapted to allow the flow of fuel to the inlet of the fuel pump at a pressure greater than said minimum fuel pressure of said pressure responsive means in said first housing; the second bore in the first housing communicating with and being connected to one end of said conduit means in an orientation of the first housing at a lower level than said opposite end of the bore in the first housing, to thereby prevent any air entrained in the fuel from passing to the fuel pump.

2. A device as claimed in claim 1, wherein the pressure responsive means in said first housing is a ball and spring valve.

3. A device as claimed in claim 1, wherein the pressure responsive means in the second housing comprises a weighted ball valve.

4. A fuel intake system for a motor vehicle comprising a carburetor; a fuel pump; a block having a bore formed therein providing a first unitary housing, one end of said bore being connected to the fuel pump outlet line, the opposite end of said bore being connected to the fuel inlet line to the carburetor, pressure responsive means mounted in said bore to prevent flow of fuel to the carburetor below a minimum fuel pressure, a second bore formed in said block extending transversely to said first bore and communicating therewith; a second block of the same configuration as said first block and having a bore formed therein providing a second unitary housing, conduit means connecting said second bore to one end of the bore in said second block, the opposite end of the bore in said second block being connected to the inlet of said fuel pump, and pressure responsive means in the bore of said second block allowing the flow of fuel to the inlet of the fuel pump at a pressure greater than said minimum fuel pressure of said pressure responsive means in said first housing; the second bore in the first housing communicating with and being connected to one end of said conduit means in an orientation of the first housing at a lower level than said opposite end of the bore in the first housing, to thereby prevent any air entrained in the fuel from passing to the fuel pump.

5. A system as claimed in claim 4, wherein the carburetor and said first housing are formed in a single unitary structure.

6. A system as claimed in claim 4, wherein the fuel pump and said second housing are formed in a single unitary structure.

* * * * *